(12) United States Patent
Johnson et al.

(10) Patent No.: US 11,537,913 B2
(45) Date of Patent: Dec. 27, 2022

(54) ARTIFICIAL INTELLIGENCE AUTOMATION FOR ENROLLMENT

(71) Applicant: Aetna Inc., Hartford, CT (US)

(72) Inventors: Rajesh Johnson, Phoenix, AZ (US); Mrinal M. Joglekar, Woodridge, IL (US); Jamie L. Potter-Watkins, Phoenix, AZ (US)

(73) Assignee: Aetna Inc., Hartford, CT (US)

( * ) Notice: Subject to any disclaimer, the term of this patent is extended or adjusted under 35 U.S.C. 154(b) by 373 days.

(21) Appl. No.: 16/816,996

(22) Filed: Mar. 12, 2020

(65) Prior Publication Data

US 2021/0287113 A1 Sep. 16, 2021

(51) Int. Cl.
*G06F 16/25* (2019.01)
*G06F 16/23* (2019.01)
*G06N 5/04* (2006.01)
*G06N 20/00* (2019.01)

(52) U.S. Cl.
CPC ........... *G06N 5/04* (2013.01); *G06F 16/2379* (2019.01); *G06F 16/258* (2019.01); *G06N 20/00* (2019.01)

(58) Field of Classification Search
CPC .......................... G06F 16/2379; G06F 16/258
See application file for complete search history.

(56) References Cited

U.S. PATENT DOCUMENTS

| | | | | |
|---|---|---|---|---|
| 10,474,792 B2* | 11/2019 | Alstad | ..................... | G06Q 10/10 |
| 2016/0058493 A1* | 3/2016 | Neal, II | ............. | A61B 18/1233 |
| | | | | 606/34 |
| 2020/0013124 A1* | 1/2020 | Obee | ....................... | G06Q 40/08 |
| 2020/0211692 A1* | 7/2020 | Kalafut | ................... | G06N 20/00 |
| 2020/0274898 A1* | 8/2020 | Xie | .......................... | G06F 21/53 |

* cited by examiner

*Primary Examiner* — Richard L Bowen
(74) *Attorney, Agent, or Firm* — Leydig, Voit & Mayer, Ltd.

(57) ABSTRACT

A system and method are disclosed for detecting anomalies in input data. The input data can include enrollment information for members of a health insurance product offered by an insurance carrier. A system is configured to process one or more parameters associated with the input data to detect whether an anomaly is indicated in the input data. At least one artificial intelligence algorithm is configured to compare a parameter in the one or more parameters to a range defined by a moving average. When an anomaly is detected, the processing can be paused and manual intervention can be facilitated. When no anomaly is detected, a database is updated based on the input data. In an embodiment, the input data is an ANSI 834 format file that includes a plurality of membership records, and the one or more parameters are derived from statistics related to the membership records.

14 Claims, 8 Drawing Sheets

Fig. 1

Input 102 (ANSI 834)

Header 210

Contents 220

Member Record 222
INS*Y      Member Level Detail
REF*OF     Subscriber Number
REF*IL     Group Sub-Location Division
DTP*336    Hire Date
NM1        Employee Name
N3         Employee Street Address
N4         Employee City, State, Zip, Country
DMG        Member Demographics
HD         Coverage Data
DTP*348    Coverage Dates
DTP*349    Coverage End Date
INS*N      Dependent
...

Member Record 222

Member Record 222

Parameters 400

Total Membership Count

Subsequent File Records

New Members to be Created

Member Records to be Updated

Demographics Total Error Count

Enrollment Total Error Count

Insufficient Subscriber Identifier

Terminate Current Enrollment

Terminate by Absence

Void Current Enrollment

Current Enrollment Benefit Change

New Member Insufficient Enrollment

ARTIFICIAL INTELLIGENCE AUTOMATION FOR ENROLLMENT

TECHNICAL FIELD

The present disclosure relates to information technology (IT) systems, and more particularly to automated tools for facilitating an enrollment process implemented by health insurance carriers.

BACKGROUND

The Health Insurance Portability and Accountability Act (HIPAA) established a requirement that all health plans or health insurance carriers accept a standard enrollment format for transmitting enrollment data electronically between a plan sponsor (e.g., employer) and a payer (e.g., insurance carrier). That enrollment format, ANSI (American National Standards Institute) 834 EDI (Electronic Data Interchange) Enrollment Implementation Format (hereinafter referred to as ANSI 834), specifies certain fields included in a file in order to transfer information related to members and benefits of an insurance product (e.g., health insurance) offered by the insurance carrier.

A plan sponsor, such as an employer or a state entity, generally transmits to the payer periodically (or provides access to retrieve) a file formatted according to the ANSI 834 format (e.g., once per day, once per month, etc.). The file contains membership records for individuals enrolled in the plan sponsor's health insurance plan. The payer then processes this file to update their records and facilitate the handling of claims filed by the various individuals that are enrolled. Processing this file manually can be time consuming and expensive. For example, a state entity may submit a file containing hundreds or thousands of records for those citizens of the state enrolled in a state-sponsored plan such as Medicare or Medicaid. In order to reduce costs and facilitate automated integration of enrollment data included in these files, some insurance carriers may utilize automated systems that attempt to parse the data from the ANSI 834 file and update one or more databases with the appropriate information parsed from the file.

However, in some cases, the ANSI 834 file may contain corrupt, inaccurate, or false information. For example, an automated system implemented by the plan sponsor may not generate an accurate file that reflects real enrollment data. For example, the fields in the file can be formatted improperly, the information in the fields can be incorrect due to improper data entry, or false records can be included in the file (e.g., records can be created for test purposes that do not reflect real membership information). If these records are received by the automated systems, the systems may perform as intended and create false records in the local database. The insurance carrier cannot rely on the records in the database in this case and, sometimes, correcting these issues can cause large disruptions to services provided by the insurance carrier (e.g., claim payments can be delayed, new claims might not be accepted, etc.). Thus, there is a need to address these and other issues with automated systems used for enrollment purposes.

SUMMARY

A system, method, and non-transitory computer-readable medium are disclosed for detecting anomalies in input data. The input data can be provided by a plan sponsor of an insurance product provided by an insurance carrier. The input data can include enrollment information for members of the insurance plan. Automated ingestion of the input data can improve the services provided by the insurance carrier. However, automated systems conventionally do a poor job of recognizing when the information in the input data is corrupted or otherwise incorrect. Improved techniques for recognizing anomalies in the input data can help improve these automated systems.

In some embodiments, a system for detecting anomalies includes a memory storing input data and one or more processors. The one or more processors are configured to process one or more parameters associated with the input data to detect whether an anomaly is indicated in the input data. At least one artificial intelligence algorithm is configured to compare a parameter in the one or more parameters to a range defined by a moving average. The one or more processors are further configured to pause the processing in response to detecting the anomaly, or update, when no anomaly is detected, a database based on the input data.

In some embodiments, the one or more parameters are derived from a plurality of membership records included in the input data. In an embodiments, the input data is an ANSI 834 format file. In another embodiment, the input data is an ANSI 837 format file.

In some embodiments, the one or more processors are associated with a health insurance carrier. The one or more processors are further configured to receive the input data from a plan sponsor via a network. The one or more processors are configured to convert the input data to a data structure in a second format based, at least in part, on one or more validation rules, and generate a report associated with the input data that includes at least one of the one or more parameters processed by the at least one artificial intelligence algorithm.

In some embodiments, the at least one artificial intelligence algorithm is included in an artificial intelligence service. At least one processor in the one or more processors is configured to call the artificial intelligence service via an application programming interface (API). The call includes the one or more parameters.

In some embodiments, the moving average is calculated, based on a sliding window, as a sum of values for the parameter received during the sliding window from a plurality of input data divided by a number of values included in the sum. The range is calculated by multiplying the moving average by a minimum coefficient and a maximum coefficient. In an embodiment, an upper limit and a lower limit of the range are learned parameters based on training the artificial intelligence algorithm.

In some embodiments, the one or more parameters include at least one of: a number of records in the input data, a number of new enrollments in the input data, a number of existing enrollments in the input data, or a number of errors in demographics data included in the input data.

In some embodiments, the one or more processors are further configured to implement a user interface that generates a notification transmitted to a client device that indicates the anomaly was detected in the input data.

In some embodiments, the one or more parameters include a plurality of parameters. Each parameter in the plurality of parameters is processed by a different artificial intelligence algorithm in a plurality of artificial intelligence algorithms Each artificial intelligence algorithm utilizes different coefficients to calculate a range to compare with a corresponding parameter in the plurality of parameters.

In some embodiments, a method is disclosed that includes the steps of receiving input data, processing, via at least one artificial intelligence algorithm, one or more parameters derived from the input data, and detecting an anomaly in the input data based on an output of the at least one artificial intelligence algorithm. Each artificial intelligence algorithm in the at least one artificial intelligence algorithm is configured to compare a value for a parameter to a range calculated based on a moving average.

In some embodiments, a non-transitory computer-readable medium is disclosed storing instructions that, when executed by one or more processors, cause the one or more processors to detect anomalies. The one or more processors perform steps including receiving input data, processing, via at least one artificial intelligence algorithm, one or more parameters derived from the input data, and detecting an anomaly in the input data based on an output of the at least one artificial intelligence algorithm. Each artificial intelligence algorithm in the at least one artificial intelligence algorithm is configured to compare a value for a parameter to a range calculated based on a moving average.

DETAILED DESCRIPTION

Artificial Intelligence (AI) and/or Deep Learning Neural Networks (DLNNs) can be utilized to assist in the automated processing of enrollment data received from one or more plan sponsors associated with insurance products offered by a payer. The payer manages an IT system including one or more processors and other network resources configured to receive input data including ANSI 834 format files, parse the input data to identify membership records specified in the ANSI 834 format file, and analyze the membership records to detect anomalies in the input data. Processing of the membership records can be paused or stopped to facilitate manual intervention in the enrollment process when anomalies are detected. AI techniques can be utilized when detecting the anomalies. In particular, an AI algorithm can compare a parameter derived from the information in the membership records to a range calculated based on a moving average. When the parameter is within the calculated range, then the comparison indicates no anomaly. When the parameter falls outside the calculated range, then the comparison indicates an anomaly.

Figure 1:
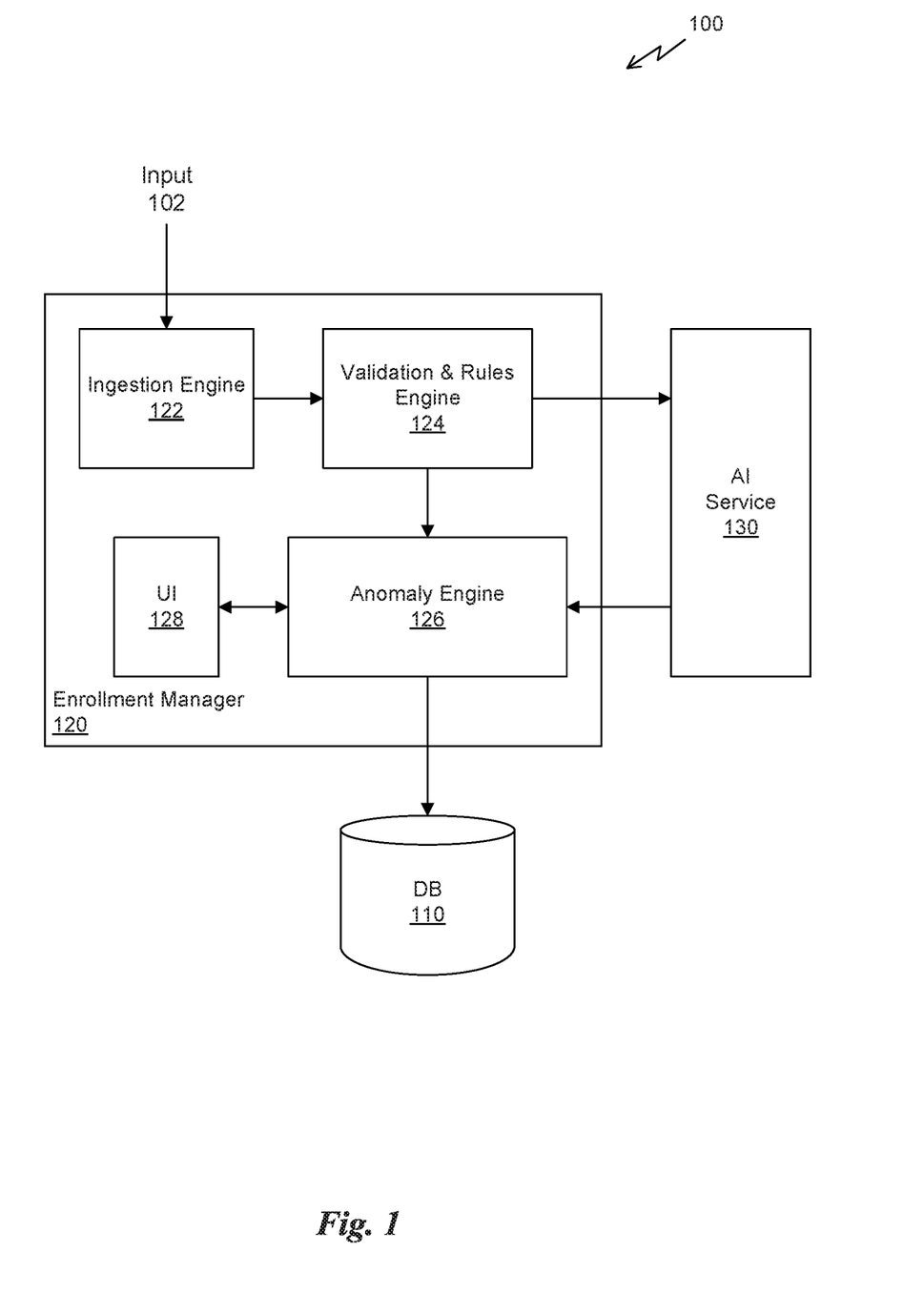
FIG. 1 illustrates a system for automated enrollment of members of an insurance product, in accordance with some embodiments.

FIG. 1 illustrates a system 100 for automated enrollment of members of an insurance product, in accordance with some embodiments. As depicted in FIG. 1, the system 100 includes a database 110, an enrollment manager 120, and an AI service 130. In an embodiment, each of the database 110, the enrollment manager 120, and the AI service 130 can be implemented on one or more devices connected to a network. For example, an insurance carrier can manage one or more data centers with a number of server devices. Each server device can include one or more processors, a memory, a network interface controller (NIC), and one or more storage devices (e.g., hard disk drives (HDD), solid state drives (SSD), or the like). Instances of the components of system 100 can be executed by the number of server devices. In some cases, a component, such as the database 110, can be implemented in a distributed manner where different instances of the component are executed on multiple server devices in the same data center or multiple data centers. In other cases, portions of a specific component can be implemented on a particular server device while other portions of the component are implemented on a separate server device. In other embodiments, the database 110, the enrollment manager 120, and the AI service 130 can be implemented on a single server device.

As depicted in FIG. 1, the enrollment manager 120 includes a number of components including, but not limited to, an ingestion engine 122, validation and rules engine (VRE) 124, an anomaly engine 126, and a user interface 128. In an embodiment, the ingestion engine 122 is configured to receive input data 102. The input data 102 can include a file, a data packet, a message (e.g., an email message, SMS message, etc.), an application programming interface (API) call, or the like. For example, the input data 102 can be provided as a file via a File Transport Protocol (FTP), an HTTP message in accordance with an API (e.g., using Representational State Transfer (REST) APIs, or the like), using Transport Control Protocol/Internet Protocol (TCP/IP), or any other well-known technique for transferring data between two computer systems over a network. The network can be a local area network (LAN) or a wide area network (WAN) such as the Internet (or a combination of one or more LANs with an interface to the WAN).

In an embodiment, the input data 102 includes information related to the enrollment of individuals in a sponsored plan comprising benefits provided in association with an insurance product offered by the insurance carrier. In some embodiments, the input data 102 is a file formatted in accordance with an ANSI 834 format. The input data 102 can include membership records associated with one or more principal members as well as dependents of the principal members.

In other embodiments, the input data 102 includes information related to insurance claims for individuals enrolled in an insurance product. In some embodiments, the input data 102 is a filed formatted in accordance with an ANSI 837 format. Of course, in yet other embodiments, the input data 102 can be provided in accordance with other types of file formats.

In an embodiment, the ingestion engine 122 is configured to periodically connect to an FTP site hosted by the plan sponsor and download any files located at a particular location on the FTP site. In other words, the ingestion engine 122 may poll each plan sponsor for new input data periodically every day, week, month or any other frequency configured by an administrator of the system 100. In another embodiment, the ingestion engine 122 passively accepts incoming requests including the input data 102 or a pointer to a location of the input data 102 on the network. For example, the request can include a uniform resource locator (URL) that enables the ingestion engine 122 to send an HTTP request to the URL to download the input data 102. As another example, the request can include the input data 102 in a body of an HTTP message, such as the input data 102 being provided in an eXtensible Markup Language (XML) or JavaScript Object Notation (JSON) format in the body of the HTTP message.

In an embodiment, the ingestion engine 122 is configured to retrieve the input data 102 and notify the VRE 124 when the input data is available. The input data 102 can be stored in a local memory, such as by storing a copy of the input data 102 in a non-volatile memory associated with a particular server device and forwarding a notification that the input data 102 is available to the VRE 124. The notification can include a pointer to the input data 102 in the non-volatile memory accessible over the network.

In an embodiment, the VRE 124 is configured to parse the input data 102 and apply validation rules that ensure that the input data 102 contains valid or expected information. In some embodiments, the VRE 124 parses the input data 102 to identify one or more membership records associated with principal members. In an embodiment, the VRE 124 creates a unique data structure for each membership record identified in the input data 102. For example, the data structure can convert the information from the ANSI 834 format into a different format, such as an XML or JSON document that maps fields of the ANSI 834 format to fields specified by the insurance carrier and utilized by the applications and/or services managed by the insurance carrier. In other embodiments, the VRE 124 creates a single data structure for multiple membership records parsed from the input data 102. For example, the file containing the ANSI 834 format data can be converted into a file containing the XML or JSON document for all membership records contained in the ANSI 834 format data.

For each membership record identified in the contents of the input data 102, the VRE 124 determines whether the membership record conforms with the expected format, such as the ANSI 834 format. More particularly, the validation rules can confirm that each element included in the membership record matches the attributes defined in the ANSI 834 standard and that a minimum number of required attributes are included in the membership record. It will be appreciated that the information included in a membership record can include optional elements such as dependent information, so the validation rules may ensure that a certain subset of possible elements are included in each membership record (e.g., member details, subscriber number, name, address, etc.). In some embodiments, the validation rules can also be applied to make sure at least a subset of the information in the fields is within an expected range. For example, when the plan sponsor is a state, the validation rules can confirm that the residential address for a member is located in that particular state (e.g., by city/state/zip/country values entered in a particular field or fields of the membership record). As another example, the validation rules can restrict information in certain fields to a subset of alternative information, such as ensuring Male/Female (M or F) options are chosen for a gender field (as well as other gender options, if allowed).

The validation rules guarantee that the input data 102 is in the correct format and that certain expected fields are included in each membership record as well as possibly restricting certain fields to contain values within a specified range (e.g., zip codes). However, the validation rules are not intended to identify whether the information in those fields is accurate or likely to be directed to a real person in contrast to, e.g., a fake person created for a test of any IT system. For an additional layer of security, AI algorithms can be employed to analyze the information included in the fields of the input data 102. The AI algorithms can analyze specific fields in the membership records themselves as well as other parameters or statistics derived from the information in the fields and determine whether the information or statistical values fall within an expected range based on historical data.

For example, the AI algorithms can analyze various parameters included in or derived from the input data 102. In one case, the AI algorithms can analyze a total number of membership records included in a particular input data 102 file and determine whether that number falls within a particular range in line with historical trends. For example, a particular state plan may experience new enrollments at a rate that, while varying, tends to follow a particular trend based on total population of the state, macroeconomic considerations, time of year, etc. and the AI algorithm can be trained to detect if the input data 102 is similar to other input data 102 or diverges from historical trends. In another case, the AI algorithms can analyze distributions of members by zip code to determine if the distribution of members by area of a state matches historical trends. In yet another case, the AI algorithms can monitor a number of membership records associated with new enrollments and/or a number of membership records associated with updated demographic information.

In some embodiments, the VRE 124 can generate one or more data structures that include parsed and validated membership records as well as, optionally, additional information in a data structure that includes statistical information or parameters derived from the membership records. In one embodiment, the VRE 124 is configured to generate API calls for an AI service 130 to analyze the output of the VRE 124. The API calls can be transmitted over the network and include the output of the VRE 124 or a pointer to a location of the output located in a network storage location.

The AI service 130 is configured to, responsive to the API call, process the output of the VRE 124 with one or more AI algorithms in order to determine whether a number of parameters in the output fall within an expected range. The output of the VRE 122 can include a parsed version of the input data 102 in a second format and/or a data structure including one or more parameters derived from the information in the input data 102. In an embodiment, the one or more AI algorithms can include an algorithm that calculates a moving average for a parameter. The algorithm can, based on a sliding window, track a moving average associated with a given parameter and compare the value for the parameter to the moving average. In some embodiments, the sliding window can be configured as a 7-day or a 30-day window such that the moving average represents an average value calculated based on parameter values received over the last 7 or 30 days, respectively. Of course, it will be appreciated that other time frames can be used for the sliding window such as 3-months or 1-year.

In an embodiment, the moving average value is compared with the instant parameter value based on a range calculated relative to the moving average value. The range can be set based on a percentage. For example, the range can be set equal to [0.79*MA,1.21*MA] where the range is given as 79% to 121% of the moving average (MA) value. The particular coefficients represent a percentage that, when multiplied by the moving average value, result in a threshold value below and above the moving average value, respectively. In some embodiments, the particular coefficients can be manually configured for each parameter tracked by the AI algorithms. In other embodiments, the particular coefficients can be updated automatically by the AI algorithm. For example, the AI algorithm can track an effective frequency that input data is outside the range and adjust the coefficients such that the rate of inclusive or exclusive values compared to the range is tracking towards a target value. For example, the coefficients can be adjusted dynamically to attempt to reject 1% of all input data as having a parameter outside of the given range.

In some embodiments, the range can be set based on a standard deviation of the parameter values. For example, the upper limit of the range can be set by adding a multiple of the standard deviation to the moving average (e.g., MA+c·σ), and the lower limit of the range can be set by subtracting a multiple of the standard deviation from the moving average (e.g., MA−c·σ). The multiple, c, can be set to an integer or, in some cases, a floating point value. For example, when c is set equal to 2, the value of the parameter is expected to fall within the range over 95% of the time based on the historical data. The standard deviation can be calculated based on values of the parameter restricted to the sliding window or, alternatively, can be calculated based on values collected over a different time frame (e.g., values within the last year).

In some embodiments, the particular coefficients and/or the upper limit and lower limit of the range can be learned during training. Specifically, a training data set can be generated that includes historical input data as well as the target output value of the algorithm. The moving average is dictated by the historical input data, but the coefficients or limits of the range can be adjusted such that a difference between the output of the algorithm and the target output values are minimized.

FIG. 1 depicts the AI service 130 as being separate and distinct from the enrollment manager 120. In some embodiments, the AI service 130 can be implemented within the AI engine 124 such that the output of the VRE 124 is directly processed by the AI algorithms within the enrollment manager 120 without requiring an API call to be made to an external service.

In some embodiments, the AI service 130 returns a response to the anomaly engine 126 that indicates whether each of the one or more parameters are within a range of corresponding threshold values. The anomaly engine 126 identifies whether any anomalies are detected in the input data 102 based on the response from the AI service 130. In an embodiment, if any of the monitored parameters are outside the given range, then an anomaly is detected. In another embodiment, if the number of parameters outside a corresponding range is greater than a threshold value, then an anomaly is detected. In yet another embodiment, if the number of parameters within a corresponding range is less than a threshold value, then an anomaly is detected.

When an anomaly is detected, the anomaly engine 126 is configured to take one or more actions based on the anomaly. In some embodiments, the anomaly engine 126 halts or pauses processing of the input data 102. A notification message may be sent to a responsible administrator in order for manual intervention in reviewing the input data 102. The notification message can comprise an API call to a user interface (UI) 128. For example, the UI 128 can include a web-based dashboard that allows a user to view notification messages for pending tasks of processing different input data 102. In another embodiment, the notification message can comprise an email message that is forwarded to an email client. The email message can notify a responsible administrator that an anomaly has been detected.

The anomaly engine 126 waits to receive input from the responsible manager, e.g., in the form of a response message that indicates whether the task should be canceled or resumed. If the task is resumed, then the anomaly is dismissed and the output of the VRE 124 is added to the database 110. However, if the task is canceled, then the output of the VRE 124 is not added to the database 110 and the input data 102 is simply dismissed.

In some embodiments, the responsible administrator can use the UI 128 to select or mark certain membership records in the output of the VRE 124. In this manner, a responsible administrator, through manual intervention, can allow certain membership records in the input data 102 to be added to the database 110 while preventing other membership records in the input data 102 from being added to the database 110. In this manner, even if the AI algorithms identify an anomaly, the responsible administrator has remedies available to correct the basis of the anomaly. For example, if there appears to be a number of invalid membership records in addition to valid membership records, then the valid membership records can be added to the database 110.

In some embodiments, the database 110 is a relational database that includes one or more tables storing information about members enrolled in one or more insurance products. For example, a first table can include member records including information such as name, address, identifiers or member IDs, birth dates, demographic information, and the like. A second table can include employment information for a member. A third table can include language preferences for a member. A fourth table can include policy information for a member. Updating the database 110 can comprise copying information from fields in the membership records from the input data 102 into fields of one or more tables related to a particular member. It will be appreciated that records can be created when a member is being added to a table or updated when information for a member previously exists in the table, but is different from the information in the membership record from the input data 102.

Those of skill in the art will appreciate that the characterization of the database 110 provided herein is merely one example of an implementation of a local data store for enrollment information. While the database 110 is described as a relational database that can be queried using, e.g., a SQL query, the database 110 can also be a key-value data store, a distributed database, and the like.

In addition, it will be appreciated that the enrollment manager 120 can includes components in addition to or in lieu of the components shown therein. For example, the UI 128 and/or the ingestion engine 122 can be implemented as separate components that are external to the enrollment manager 120 and interface with the enrollment manager 120 through one or more APIs.

Figure 2:
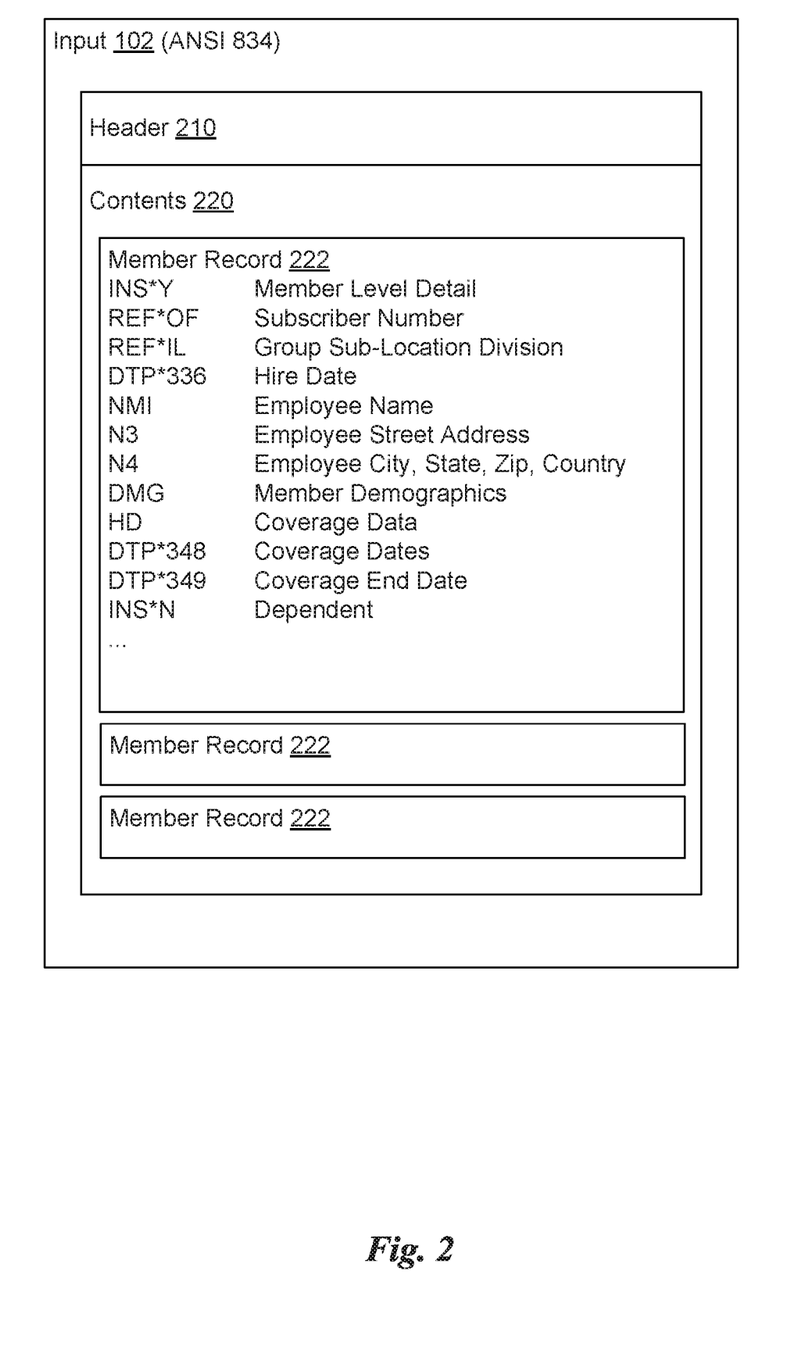
FIG. 2 is an example of an ANSI 834 format file, in accordance with some embodiments.

FIG. 2 is an example of an ANSI 834 format file, in accordance with some embodiments. The input data 102 is a file structure stored in a memory such as a hard disk drive (HDD) or temporarily loaded into a volatile memory such as dynamic random access memory (DRAM). The input data 102 can include a header 210 and file contents 220. The header 210 can contain information about the contents of the file. For example, the header can specify the file type, format parameters of the file, a size or length of the file, and the like. The contents 220 can include encoded data for a plurality of membership records 222. In one embodiment, the membership records 222 are data structures having a number of fields including a member level detail field (INS*Y), a subscriber number field (REF*OF), a group sub-location division field (REF*IL), a hire date field (DTP*336), an employee name field (NMI), an employee street address field (N3), an employee city/state/zip/country field (N4), a member demographics field (DMG), a coverage data field (HD), a coverage dates field (DTP*348), a coverage end date field (DTP*349), and a dependent field (INS*N). The fields can repeat for each dependent of the member associated with the membership record. It will be appreciated that the fields can include any number and specified order of fields as defined in the ANSI 834 standard.

The member level detail field is described as containing a line of ASCII text. For example, the field can contain the text "INS*Y*18*030*XN*A*E**FT" where: "INS" identifies the line as a member level detail field; "Y" indicates whether the member is a subscriber (Y) or a dependent (N); "18" indicates a relationship as an employee (18), a spouse (01), or a child (19); "030" indicates the record is full; "XN" is a reason code; "A" indicates a status code as active (A) or COBRA (C); "E" indicates whether the plan is a Medicare plan (D) or not a Medicare plan (E); and "H" is the employee status as full-time (FT) or part-time (PT). The options in the field are separated by a "*" character and two consecutive "*" characters indicates a missing field. In this case, the missing field can indicate whether the employee qualifies for COBRA.

The other fields in each membership records have various specified information, such as including an employee's social security number or other identifier, account numbers, plan identifiers, marital status, or the like. In addition, the contents 220 can include one or more membership records 222, either concatenated therein or separated by a delimiter or other intervening data or information.

Information related to the ANSI 834 standard is well-known by those of skill in the arts subject to the HIPAA law. However, it will be appreciated that the embodiments described herein are not merely limited to a specific format of input data 102. For example, if the ANSI 834 standard is changed, then various embodiments can be adapted to work with the different format containing information. Furthermore, the encoded contents 220 and/or the input data file 102 can be optionally encrypted to protect the privacy of the information contained therein. It will be appreciated that the contents of the ANSI 834 file contain personally identifying information such as name, address, social security number, dependents' names, marital status, and other information that can be used for nefarious purposes by unscrupulous people. Therefore, additional layers of security such as private key exchange (PKA) techniques or using digital certificates can be used when transferring the input data 102 to the ingestion engine 122. In some embodiments, the ingestion engine 122 can be configured to confirm that the source of the input data 102 is a trusted data source and decrypt the input data 102 upon receipt of the input data 102 using well-known encryption and decryption techniques.

Figure 3:
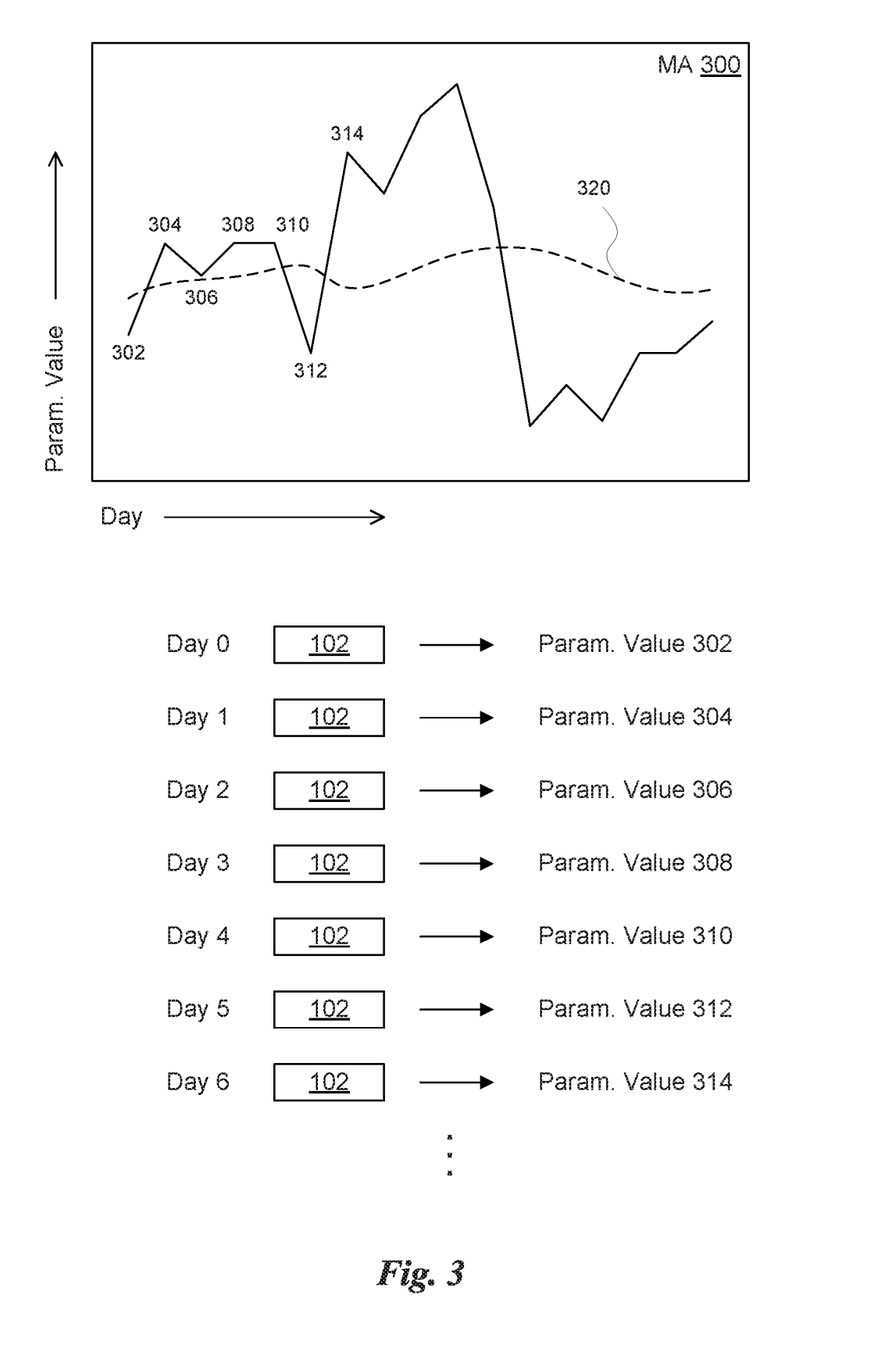
FIG. 3 provides a conceptual illustration of a moving average, in accordance with some embodiments.

FIG. 3 provides a conceptual illustration of a moving average, in accordance with some embodiments. The AI service 130 can include a number of different algorithms. In some embodiments, each algorithm can analyze a corresponding parameter generated by the VRE 124 based on the input data 102. In an embodiment, an AI algorithm implemented by the AI service 130 compares a parameter with a range to determine whether the parameter falls within the range. The range is dynamic and determined by the artificial intelligence algorithm based on a calculated moving average of the parameter derived from input data 102 received over a previous period of time (e.g., 30 days). The range, therefore, tracks expected values of the parameter by looking for a sudden and out of the ordinary change in the parameter value.

A chart 300 illustrates the concept of the moving average. Each day, a different input data 102 file can be received with new enrollment information. A data structure is generated by the VRE engine 124 based on the input data 102 and a parameter value in the data structure can be analyzed by the AI algorithm. As different parameters are generated each day, the value of the parameter can change from one day to another. As is plotted in the chart 300, a first input data 102 is received on day zero and a corresponding parameter value 302 is shown on the left side of the chart 300. The following day, day one, a second input data 102 is received and a corresponding parameter value 304, higher than parameter value 302 is plotted on the chart to the right of parameter value 302. Additional input data 102 are received on subsequent days and plotted as parameter values 306, 308, 310, 312, and 314 and so forth.

A moving average 320 can be calculated from the plotted parameter values. The moving average 320 changes daily as old parameter values are excluded from the moving average 320 and new parameter values take their place. As is well known, the moving average 320 can be calculated by summing the parameter values collected over the previous N days and then dividing by the total number of days in a sliding window. The size of the sliding window (e.g., N days), can be set based on a particular application. A smaller size is more responsive to short term trends while a larger size is more stable and is not as responsive to short term outliers. The above description of the calculation assumes that one parameter value is added per day (i.e., the AI algorithms processes parameter values from one ANSI 834 formatted file per day). However, more generally, the moving average can be calculated by summing a number of data points collected during the sliding window and then dividing by the total number of data points. This general statement of the moving average is applicable regardless of whether multiple data points are collected each day or data points are only collected more sporadically (i.e., less than once per day). For example, if 45 data points are collected in a 30-day window, then the moving average can be calculated by summing the 45 data points and then dividing by 45.

The AI algorithm compares a parameter value derived from a data structure generated by the VRE 124 to a range for the parameter value calculated by the AI algorithm. If the parameter value falls within the range, then the parameter value is acceptable and not anomalous. However, if the parameter value falls outside the range, then the parameter value can be indicated to be an anomaly that warrants further analysis or investigation. The range can be calculated by multiplying the moving average 320 by a low and high coefficient (e.g., a minimum coefficient and a maximum coefficient). The minimum coefficient can be less than 1.0 and the maximum coefficient can be greater than 1.0. In effect the range represents a percentage below and above the moving average 320 that indicates that a parameter value is similar to previously received values for the parameter. In other embodiments, the range can also be calculated by adding or subtracting a multiple of the standard deviation for a parameter value to a moving average for the parameter.

In some embodiments, the AI algorithm can utilize configurable parameters for the size of the sliding window and the coefficients used for calculating the range. In an embodiment, an administrator can pre-set the configurable parameters based on analysis of historical data for what would constitute an adequate result. For example, tests of the AI algorithm can be run using historical input data to determine the best values for the size of the sliding window and the proper coefficients to use for calculating the range. The tests can pick values that provide for an acceptable frequency of detected anomalies or that accurately detect known anomalies in the historical input data.

In another embodiment, the AI algorithm can be trained using historical data and a target output (i.e., whether the algorithm classifies the parameter value as acceptable or an anomaly) in order to adjust the configurable parameters. While the moving average value is not trainable because it depends on the calculation of an equation based entirely on the order and values of the parameter over time, the specific classification of whether the parameter value should be identified as an anomaly given the specific set of inputs, and the order of said inputs, in the training set can be adjusted in order to teach the AI algorithm where to set the coefficients for the range and/or the size of the sliding window. In this case, an advanced analysis of historical data is not needed to find the optimal size of the sliding window and/or coefficients. Instead, only a conclusion as to whether a specific parameter value is indicative of an anomaly is needed and then the optimal parameters for the algorithm can be learned.

In some embodiments, the parameters for the algorithm can be trained based on feedback provided by a user. For example, as new input data is received, the AI algorithm identifies the parameter value as either acceptable or indicative of an anomaly. In the case of the parameter being acceptable, the configurable parameters of the algorithm can be changed to narrow the acceptable range for new input data. In the case of the parameter being identified as an anomaly, a message is sent to a responsible administrator to review the input data and confirm whether there is an anomaly. If the responsible administrator indicates that the parameter value is acceptable and that, after further inspection, there is no anomaly in the input data, then the configurable parameters can be changed to broaden the acceptable range for new input data such that false positives are less likely to occur. However, if the responsible administrator indicates that the anomaly was confirmed, the configurable parameters can remain the same. The amount that the configurable parameters are changed can be small and/or the amount of the incremental change can be different depending on whether the parameter is incremented or decremented. For example, when the expected number of anomalies is small, the scale of broadening the range can be much larger than the scale of narrowing the range to reflect the relative scarcity of false positives of an anomaly compared to the normal case where the parameter is acceptable.

In other embodiments, other techniques for automatically adjusting the configurable parameters of the algorithm are contemplated as being within the scope of the AI algorithm. For example, the parameters for the range (e.g., coefficients) should only be changed to narrow the range after detecting a threshold number of acceptable results in a row (e.g., acceptable results for 30 days in a row). In contrast, the parameters for the range are broadened whenever an anomaly results in feedback, based on further manual analysis, that the anomaly was a false positive. Since such cases are rare and could reflect that the range is too narrow, the range may be increased. In some cases, the range can be incremented or decremented in an unbalanced manner. In other words, the minimum value of the range can be adjusted separately and distinct from the maximum value of the range. This can make sense where false positives are detected near either the low end or the high end of the range.

If the parameter value is greater than the maximum value of the range, then only the maximum value is adjusted up to broaden the range. Similarly, if the parameter value is less than the minimum value of the range, then only the minimum value is adjusted down to broaden the range.

Figure 4:
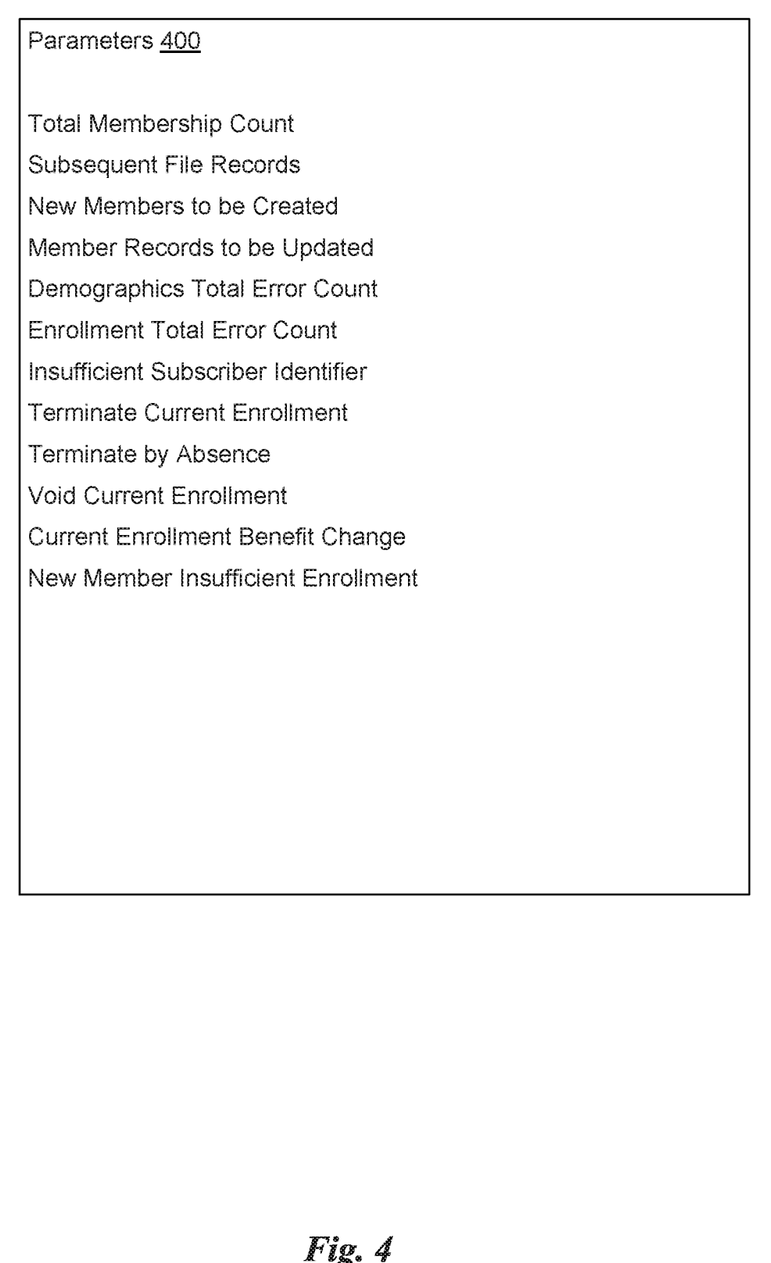
FIG. 4 illustrates an aggregate data structure that includes parameters derived from input data, in accordance with some embodiments.

FIG. 4 illustrates a data structure that includes parameters 400 related to an input data 102, in accordance with some embodiments. In some embodiments the VRE 122, in addition to converting the information in the input data 102 from the ANSI 834 format to a second preferred format, can generate a data structure that includes a number of parameters 400 derived from the input data 102.

In an embodiment, the parameters 400 in the data structure specify statistics related to the total number of membership records included in the input data 102. For example, as depicted in FIG. 4, the statistics can indicate a total number of membership records (e.g., enrollment records indicated with an INS* field) included in the input data 102. The statistics can also include a number of subsequent file records. Other statistics can include a number of new enrollments identified in the input data 102; a number of existing enrollments to be updated; a total error count in demographics data as identified by validation rules (e.g., incorrect city/state/zip/country data, incorrect gender information); a total error count in enrollment data as identified by validation rules (e.g., incorrect benefit information, incorrect employer information, etc.); a number of records with insufficient subscriber identifier information; a total number of records for terminating enrollment; a total number of records terminated based on absence of enrollment data; a total number of enrollment records voided; a total number of membership records indicating a change in benefit; and a total number of new membership records with insufficient enrollment information. It will be appreciated that the list set forth above is not exhaustive and that additional statistics or parameters 400 can be included in the data structure. Furthermore, the statistics can be derived in different manners. For example, a statistic based on total error count can be provided as an absolute value of the number of membership records in the input data 102 with identified errors or as a percentage of the membership records with identified errors.

Figure 5:
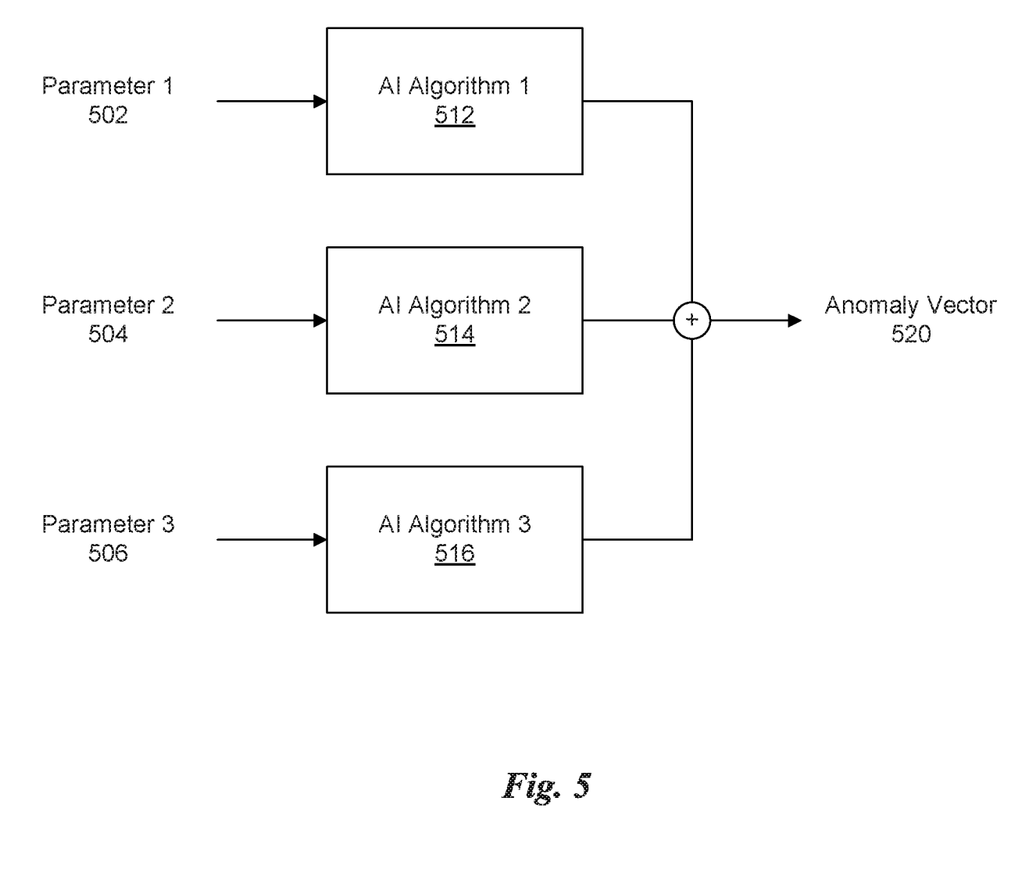
FIG. 5 illustrates a plurality of artificial intelligence algorithms configured to analyze multiple parameters from the report, in accordance with some embodiments.

FIG. 5 illustrates a plurality of AI algorithms configured to analyze multiple parameters from the data structure of FIG. 4, in accordance with some embodiments. As depicted in FIG. 5, three AI algorithms are configured to process three separate and distinct parameters from the data structure of FIG. 4. A first AI algorithm 512 processes a first parameter 502, a second AI algorithm 514 processes a second parameter 504, and a third AI algorithm 516 processes a third parameter 506. Each AI algorithm generates an indication of whether the corresponding parameter is indicative of an anomaly in the input data 102. In some embodiments, each AI algorithm outputs a binary classification (e.g., 0 or 1) that indicates whether the parameter is acceptable or indicative of an anomaly. The outputs of each of the AI algorithms are combined (e.g., concatenated) to form an anomaly vector 520. It will be appreciated that three AI algorithms are shown in FIG. 5, but any number of AI algorithms are contemplated as processing any number of parameters in parallel.

The anomaly engine 126 receives the anomaly vector 520 and determines whether there is an indication of an anomaly in the input data 102. In an embodiment, if any bit in the anomaly vector 520 is set (i.e., indicating that there is an indication of an anomaly in a corresponding parameter), then the anomaly engine 126 halts the processing of the input data 102 and issues a notification to an administrator to review the parameters 400 and/or the input data 102 to determine if corrective action (e.g., canceling the task, modifying or deleting certain membership records, etc.) is needed.

In another embodiment, if the anomaly vector 520 includes a number of set bits above a threshold number of set bits, then the anomaly engine 126 halts the processing of the input data 102 and issues a notification to an administrator to review the parameters 400 and/or the input data 102 to determine if corrective action is needed. In such embodiments, the threshold number of set bits can be greater than or equal to one to require two or more parameters be anomalous before an anomaly is detected. For example, if twelve parameters are analyzed by twelve different AI algorithms, then the threshold for an anomaly being detected by the anomaly engine 126 can require at least two or three different indications of an anomaly. In other words, a small number (e.g., one or two, for example) of parameters can fall outside of an expected range without halting the processing of the input data 102 due to a potential anomaly.

Figure 6:
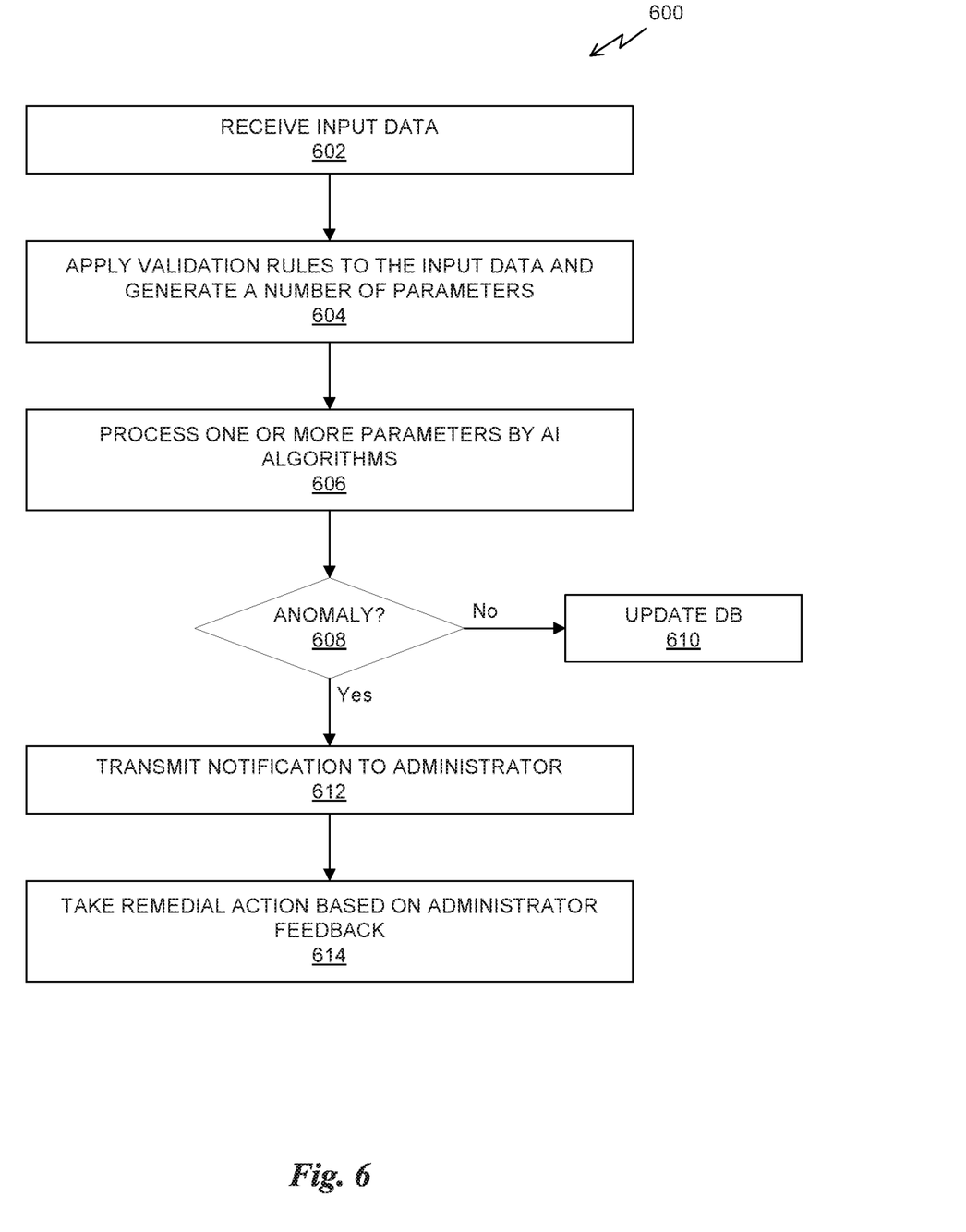
FIG. 6 is a flow diagram of a method for processing enrollment data, in accordance with some embodiments.

FIG. 6 is a flow diagram of a method 600 for processing enrollment data, in accordance with some embodiments. The method 600 can be performed by a program, custom circuitry, or by a combination of custom circuitry and a program. Furthermore, persons of ordinary skill in the art will understand that any system that performs method 600 is within the scope and spirit of the embodiments described herein.

At step 602, input data is received. In an embodiment, an ingestion engine 110 retrieves an ANSI 834 format file from a network location. The input data 102 can be stored in a memory accessible by an enrollment manage 120. In other embodiments, the input data 102 is a different file type such as an ANSI 837 claims format file.

At step 604, validation rules are applied to the input data. In some embodiments, the input data 102 can be converted from a first format to a second format. For example, the ANSI 834 format file can be converted to a different data structure that matches fields required by a database 140 maintained by an insurance provider. In an embodiment, the VRE 124 generates a data structure with one or more parameters 400 related to statistics derived from the input data 102. The data structure can be provided in addition to the data structure generated by converting the input data 102 in accordance with the validation rules.

At step 606, one or more parameters are processed by AI algorithms 606. In an embodiment, a number of parameters 400 are processed by the AI algorithms to generate an anomaly vector 520 that indicates whether each parameter of the one or more parameters 400 are indicative of an anomaly in the input data 102. It will be appreciated that all parameters 400 in the data structure are not necessarily the selected one or more parameters 400, and the selected one or more parameters 400 can be selected based on analysis of historical data that identifies which parameters 400 are most indicative of anomalies in the input data 102.

At step 608, it is determined whether an anomaly is indicated based on the processing by the AI algorithms. In an embodiment, an anomaly is detected when at least one bit in the anomaly vector 520 is set, which indicates at least one parameter was outside the bounds of an expected range based on a moving average of the parameter calculated from previous input data. In another embodiment, an anomaly is detected when a sum of the bits in the anomaly vector 520 is greater than a threshold value, which indicates at least two or more parameters, corresponding to the threshold value, are outside the bounds of an expected range based on a moving average of each corresponding parameter calculated from previous input data.

If, at step 608, no anomaly is detected, then, at step 610, the membership data output by the VRE 124 is utilized to update a database 110 that includes enrollment data. The membership records in the output can be used to update records in the database 110 or create new records in the database 110. However, if, at step 608, an anomaly is detected, then, at step 612, a notification is transmitted to a responsible administrator. In an embodiment, an email is transmitted to an email address associated with the responsible administrator. In another embodiment, a message is transmitted to a UI 128, such as a web-based dashboard implemented by a server device and accessible from a browser application in a client device. The message can cause the UI 128 to display a notification to the responsible administrator that indicates an anomaly is detected in the input data 102 and prompt the responsible administrator to select a remedial action.

At step 614, remedial action is taken based on feedback from the responsible administrator. In an embodiment, remedial action can be provided by providing simply commands in the body of an email message (e.g., including the term "STOP" or "DISMISS" in the body of the email message). In another embodiment, the UI 128 can facilitate the responsible administrator to issue commands for remedial action. For example, a dashboard can provide the responsible administrator the ability to view the parameters 400, edit the output of the membership records in the output of the VRE 124, cancel the processing of the input data 102, or resume processing of the input data 102 to permit the database 110 to be updated based on the membership records.

Figure 7:
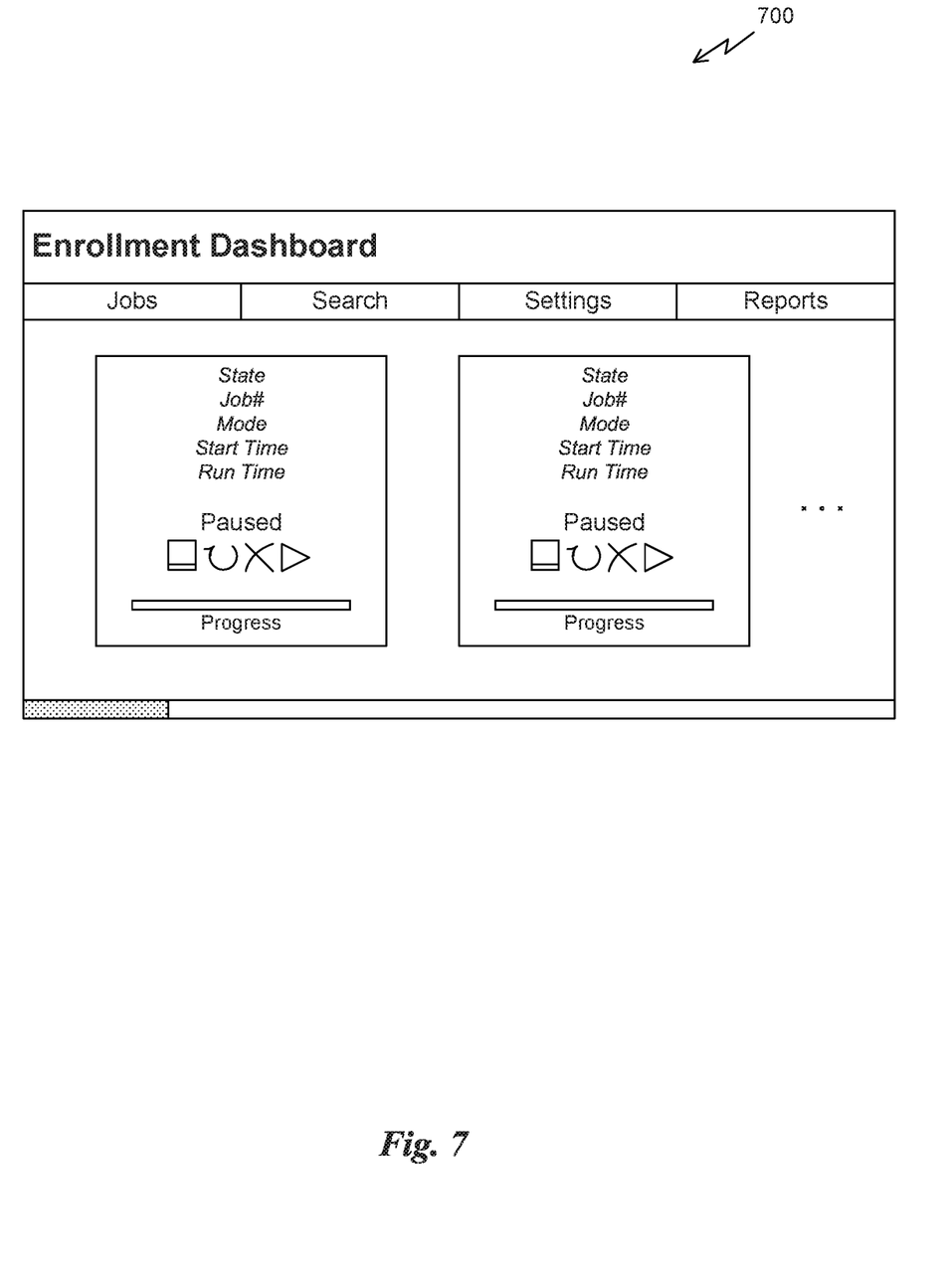
FIG. 7 illustrates an exemplary dashboard, in accordance with some embodiments.

FIG. 7 illustrates an exemplary dashboard 700, in accordance with some embodiments. In an embodiment, the dashboard 700 is an example of a graphical user interface (GUI) associated with the UI 128. The dashboard 700 can be displayed in a browser of a client device that communicates with a server device that implements the UI 128. The dashboard 700 can provide indications of pending tasks (or jobs) that are currently being processed by the enrollment manager 120. A graphical element, such as a box or region of the displayed web page in the browser, can provide information on each pending job, such as a name of the state or plan sponsor associated with the input data 102, an identifier for the task such as a job number, a mode of processing the task, a start time of the task, and an elapsed run time of the task. The graphical element can also show a current status of the task, such as "Paused" or "Running" or "Canceled", as well as a progress associated with the task, such as indicating whether the ingestion engine 122 has completed processing, the VRE 124 has completed processing, or whether the database 110 has been updated by the anomaly engine 126.

The graphical element for a particular job can also include elements such as buttons or other interactive elements that enable a responsible administrator to take remedial actions related to that particular job. As depicted in FIG. 7, the interactive elements include a button that causes a log or information associated with the membership records and/or parameters 400 to be viewed and/or edited by the responsible administrator. Another interactive element enables the job to be restarted. As jobs are paused, new jobs can advance and change the parameters of the AI algorithms (e.g., the moving average changes or the coefficients for calculating a range for a particular parameter will change over time). As such, a job can be restarted to determine whether the anomaly is still detected in accordance with the new parameters. Another interactive element allows the responsible administration to cancel the job, thereby discarding the membership records included in the input data 102. Another interactive element allows for the job to be resumed, essentially allowing the responsible administrator to override the finding of an anomaly and proceed with the update to the database 110.

Different jobs can be displayed in different graphical elements of the dashboard 700, such as when multiple pending jobs are paused due to detected anomalies. The dashboard 700 can also include a function to search for pending or completed jobs by keywords or other criteria, manage settings associated with the dashboard 700, or view parameters 400 related to each job or statistics related to all jobs (e.g., number of jobs completed per month, number of jobs where anomalies were detected, etc.).

It will be appreciated that the dashboard 700 is merely shown as one exemplary implementation of the UI 128. However, the specific elements of the dashboard 700 may be expanded or contracted as particular applications require. Furthermore, the UI 128 can be implemented as a web-based application, a client application viewed through an APP on a mobile device or tablet, a conventional desktop application, or the like.

Figure 8:
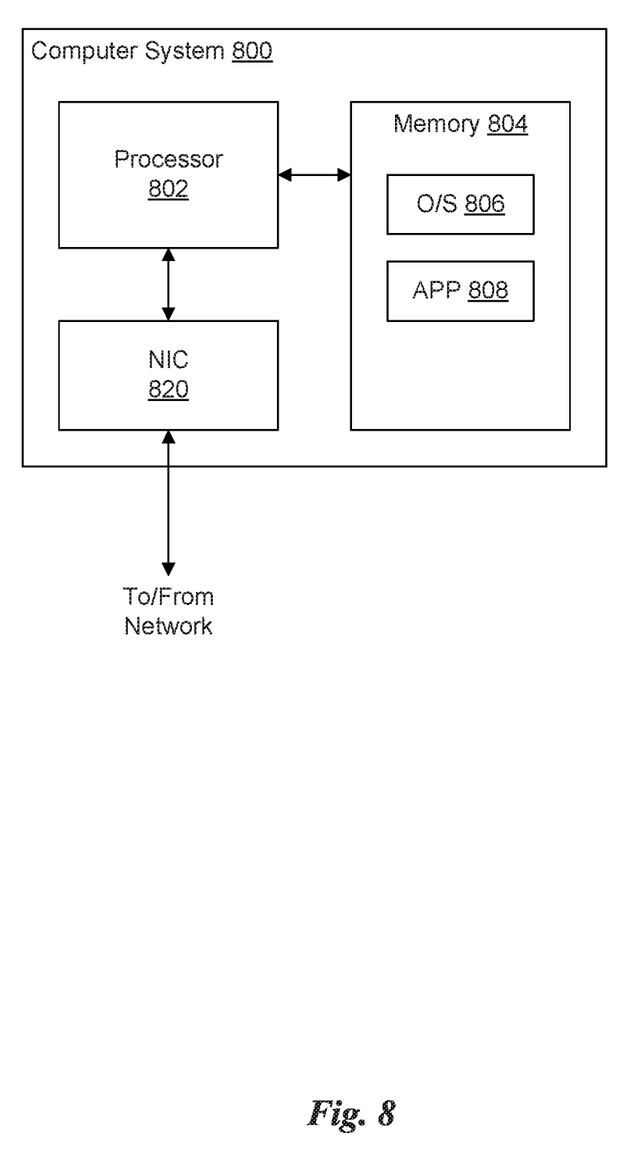
FIG. 8 illustrates an exemplary computer system, in accordance with some embodiments.

FIG. 8 illustrates an exemplary computer system 800, in accordance with some embodiments. The computer system 800 includes a processor 802, a non-volatile memory 804, and a network interface controller (NIC) 820. The processor 802 can execute instructions that cause the computer system 800 to implement the functionality various elements of the system 100 described above. The computer system 800 can also implement a client device configured to display the GUI on a browser application or other application.

Each of the components 802, 804, and 820 can be interconnected, for example, using a system bus to enable communications between the components. The processor 802 is capable of processing instructions for execution within the system 800. The processor 802 can be a single-threaded processor, a multi-threaded processor, a vector processor or parallel processor that implements a single-instruction, multiple data (SIMD) architecture, or the like. The processor 802 is capable of processing instructions stored in the volatile memory 804. In some embodiments, the volatile memory 804 is a dynamic random access memory (DRAM). The instructions can be loaded into the volatile memory 804 from a non-volatile storage, such as a Hard Disk Drive (HDD) or a solid state drive (not explicitly shown), or received via the network. In an embodiment, the volatile memory 804 can include instructions for an operating system 806 as well as one or more applications 808. It will be appreciated that the application(s) 808 can be configured to provide the functionality of one or more components of the system 100, as described above. The NIC 820 enables the computer system 800 to communicate with other devices over a network, including a local area network (LAN) or a wide area network (WAN) such as the Internet.

It will be appreciated that the computer system 800 is merely one exemplary computer architecture and that the processing devices implemented in the system 100 can include various modifications such as additional components in lieu of or in addition to the components shown in FIG. 8. For example, in some embodiments, the computer system 800 can be implemented as a system-on-chip (SoC) that includes a primary integrated circuit die containing one or more CPU cores, one or more GPU cores, a memory management unit, analog domain logic and the like coupled to a volatile memory such as one or more SDRAM integrated circuit dies stacked on top of the primary integrated circuit dies and connected via wire bonds, micro ball arrays, and the like in a single package (e.g., chip). In another embodiment, the computer system 800 can be implemented as a server device, which can, in some embodiments, execute a hypervisor and one or more virtual machines that share the hardware resources of the server device.

It is noted that the techniques described herein may be embodied in executable instructions stored in a computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. Other elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the embodiments as claimed.

What is claimed is:

1. A system for detecting anomalies, the system comprising:
   a memory storing input data in a first format; and
   one or more processors associated with a health insurance carrier and configured to:
      process one or more parameters associated with the input data to detect whether an anomaly is indicated in the input data, wherein at least one artificial intelligence algorithm is configured to compare a parameter in the one or more parameters to a range defined by a moving average; and
      pause the processing in response to detecting the anomaly, or
      update, responsive to not detecting the anomaly, a database based on the input data,
   wherein the input data is one of:
      an ANSI 834 format file; or
      an ANSI 837 format file; and
   wherein the one or more processors are further configured to:
      receive the input data from a plan sponsor via a network;
      generate a data structure associated with the input data that includes at least one of the one or more parameters processed by the at least one artificial intelligence algorithm;
      convert the input data to a second format based, at least in part, on one or more validation rules; and
      store the input data in the second format in the data structure.

2. The system of claim 1, wherein the one or more parameters are derived from a plurality of membership records included in the input data.

3. The system of claim 1, wherein the at least one artificial intelligence algorithm is included in an artificial intelligence service, wherein at least one processor in the one or more processors is configured to call the artificial intelligence service via an application programming interface (API), and wherein the call includes the one or more parameters.

4. The system of claim 1, wherein the moving average is calculated, based on a sliding window, as a sum of values for the parameter received during the sliding window from a plurality of input data divided by a number of values included in the sum, and wherein the range is calculated by multiplying the moving average by a minimum coefficient and a maximum coefficient.

5. The system of claim 1, wherein an upper limit and a lower limit of the range are learned parameters based on training the artificial intelligence algorithm.

6. The system of claim 1, wherein the one or more parameters include at least one of: a number of records in the input data, a number of new enrollments in the input data, a number of existing enrollments in the input data, or a number of errors in demographics data included in the input data.

7. The system of claim 1, wherein the one or more processors are further configured to implement a user interface that generates a notification transmitted to a client device that indicates the anomaly was detected in the input data.

8. The system of claim 1, wherein the one or more parameters include a plurality of parameters, wherein each parameter in the plurality of parameters is processed by a different artificial intelligence algorithm in a plurality of artificial intelligence algorithms, and wherein each artificial intelligence algorithm utilizes different coefficients to calculate a range to compare with a corresponding parameter in the plurality of parameters.

9. A method, comprising:
   receiving input data in a first format;
   processing, via at least one artificial intelligence algorithm, one or more parameters derived from the input data, wherein each artificial intelligence algorithm in the at least one artificial intelligence algorithm is configured to compare a value for a parameter to a range calculated based on a moving average; and
   detecting an anomaly in the input data based on an output of the at least one artificial intelligence algorithm,
   wherein the input data is received from a plan sponsor via a network and is one of:
      an ANSI 834 format file; or
      an ANSI 837 format file; and
   wherein the method further comprises:
      generating a data structure associated with the input data that includes at least one of the one or more parameters processed by the at least one artificial intelligence algorithm,
      converting the input data to a second format based, at least in part, on one or more validation rules; and
      storing the input data in the second format in the data structure.

10. The method of claim 9, wherein the moving average is calculated, based on a sliding window, as a sum of values for the parameter received during the sliding window from a plurality of input data divided by a number of values included in the sum, and wherein the range is calculated by multiplying the moving average by a minimum coefficient and a maximum coefficient.

11. The method of claim 9, wherein an upper limit and a lower limit of the range are learned parameters based on training the artificial intelligence algorithm.

12. The method of claim 9, the method further comprising:
   generating a notification transmitted to a client device that indicates the anomaly was detected in the input data.

13. A non-transitory computer-readable medium storing instructions that, when executed by one or more processors, cause the one or more processors to detect anomalies by performing steps comprising:
   receiving input data in a first format;
   processing, via at least one artificial intelligence algorithm, one or more parameters derived from the input data, wherein each artificial intelligence algorithm in the at least one artificial intelligence algorithm is configured to compare a value for a parameter to a range calculated based on a moving average; and
   detecting an anomaly in the input data based on an output of the at least one artificial intelligence algorithm, wherein the input data is received from a plan sponsor via a network and is one of:
an ANSI 834 format file; or
an ANSI 837 format file; and wherein the method further comprises:
generating a data structure associated with the input data that includes at least one of the one or more parameters processed by the at least one artificial intelligence algorithm,
converting the input data to a second format based, at least in part, on one or more validation rules; and
storing the input data in the second format in the data structure.

14. The computer-readable medium of claim 13, wherein the moving average is calculated, based on a sliding window, as a sum of values for the parameter received during the sliding window from a plurality of input data divided by a number of values included in the sum, and wherein the range is calculated by multiplying the moving average by a minimum coefficient and a maximum coefficient.

\* \* \* \* \*